United States Patent
Wang

(10) Patent No.: US 9,647,987 B1
(45) Date of Patent: *May 9, 2017

(54) TRANSFERRING DATA

(71) Applicant: Amazon Technologies, Inc., Seattle, WA (US)

(72) Inventor: Guam Wen William Wang, Henderson, NV (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,588

(22) Filed: Aug. 10, 2016

Related U.S. Application Data

(63) Continuation of application No. 14/665,477, filed on Mar. 23, 2015, now Pat. No. 9,444,798.

(51) Int. Cl.
*H04L 29/06* (2006.01)
*G06F 21/62* (2013.01)

(52) U.S. Cl.
CPC ...... *H04L 63/0236* (2013.01); *G06F 21/6218* (2013.01); *H04L 63/061* (2013.01)

(58) Field of Classification Search
CPC ... H04L 9/085; G06F 21/565; G06F 21/6209; G06F 21/78; G06F 21/805
USPC ...................................................... 713/168
See application file for complete search history.

(56) References Cited

U.S. PATENT DOCUMENTS

| | | |
|---|---|---|
| 2001/0007107 A1 | 7/2001 | Yamaguchi et al. |
| 2001/0029831 A1 | 10/2001 | Tsutsumi et al. |
| 2001/0047378 A1 | 11/2001 | Seo et al. |
| 2002/0042859 A1 | 4/2002 | Lowry et al. |
| 2010/0153740 A1 | 6/2010 | Dodgson et al. |
| 2012/0072723 A1 | 3/2012 | Orsini et al. |

OTHER PUBLICATIONS

Scott, Logan, and Dorothy E. Denning. "Location Based Encryption and its Role in Digital Cinema Distribution." (2003).*
Sundareswaran, Smitha, Anna Squicciarini, and Dan Lin. "Ensuring distributed accountability for data sharing in the cloud." IEEE Transactions on Dependable and Secure Computing 9.4 (2012): 556-568.*
U.S. Appl. No. 14/665,477, "Notice of Allowance", Jul. 1, 2016, 14 pages.
Chen et al., "RAID: High-Performance, Reliable Secondary Storage", ACM Computing Surveys, vol. 26, No. 2,, Jun. 1994, pp. 146-185.

(Continued)

*Primary Examiner* — Syed Zaidi
(74) *Attorney, Agent, or Firm* — Kilpatrick Townsend & Stockton LLP

(57) ABSTRACT

Techniques for transferring data may be provided. For example, destination files may be generated from a source file. Information about at least a location for storing at least one of the destination files on a destination computing resource may be determined. A master file may be generated and may include a portion of the information. The at least one destination file and the master file may be sent to the destination computing resource. The sending may cause the destination computing resource to at least store the sent destination file at the location.

20 Claims, 8 Drawing Sheets

(56) References Cited

OTHER PUBLICATIONS

Johnson, "MLS-Net and SecureParser: A New Method for Securing and Segregating Network Data", 4th International Symposium on Risk Management and Informatics: WMSI2007, Orlando Florida, USA Systemics, Cybernetics and Informatics vol. 6—No. 5, Jul. 8, 2007, pp. 28-35.
Schnitzer et al., "Secured Storage Using SecureParser®",proceedings of the 2005 ACM workshop on Storage security and survivability, 2005, pp. 135-140.
Sivathanu et al., "Ensuring data integrity in storage: techniques and applications", Proceedings of the 2005 ACM workshop on Storage security and survivability, 2005, pp. 1-22.

\* cited by examiner

TRANSFERRING DATA

CROSS REFERENCE TO RELATED APPLICATIONS

This application is a continuation of U.S. patent application Ser. No. 14/665,477, filed Mar. 23, 2015, and titled "TRANSFERRING DATA," the content of which is herein incorporated by reference in its entirety.

BACKGROUND

More and more users are turning to computing devices and network-based resources to access various types of services. For example, a network-based resource, such as a data center, may be configured to host computing services or to store data for a user. Typically, to access these and other network-based services, the user operates a computing device to connect to the network-based resource over a network. The network may facilitate a data exchange between the network-based resource and the computing device.

Over time, data associated with the services or with usages of the services may be generated and stored on a computing resource of a network. From time to time, the data may also be transferred to another computing resource on the same or on another network.

BRIEF DESCRIPTION OF THE DRAWINGS

Various embodiments in accordance with the present disclosure will be described with reference to the drawings, in which.

DETAILED DESCRIPTION

Figure 1:
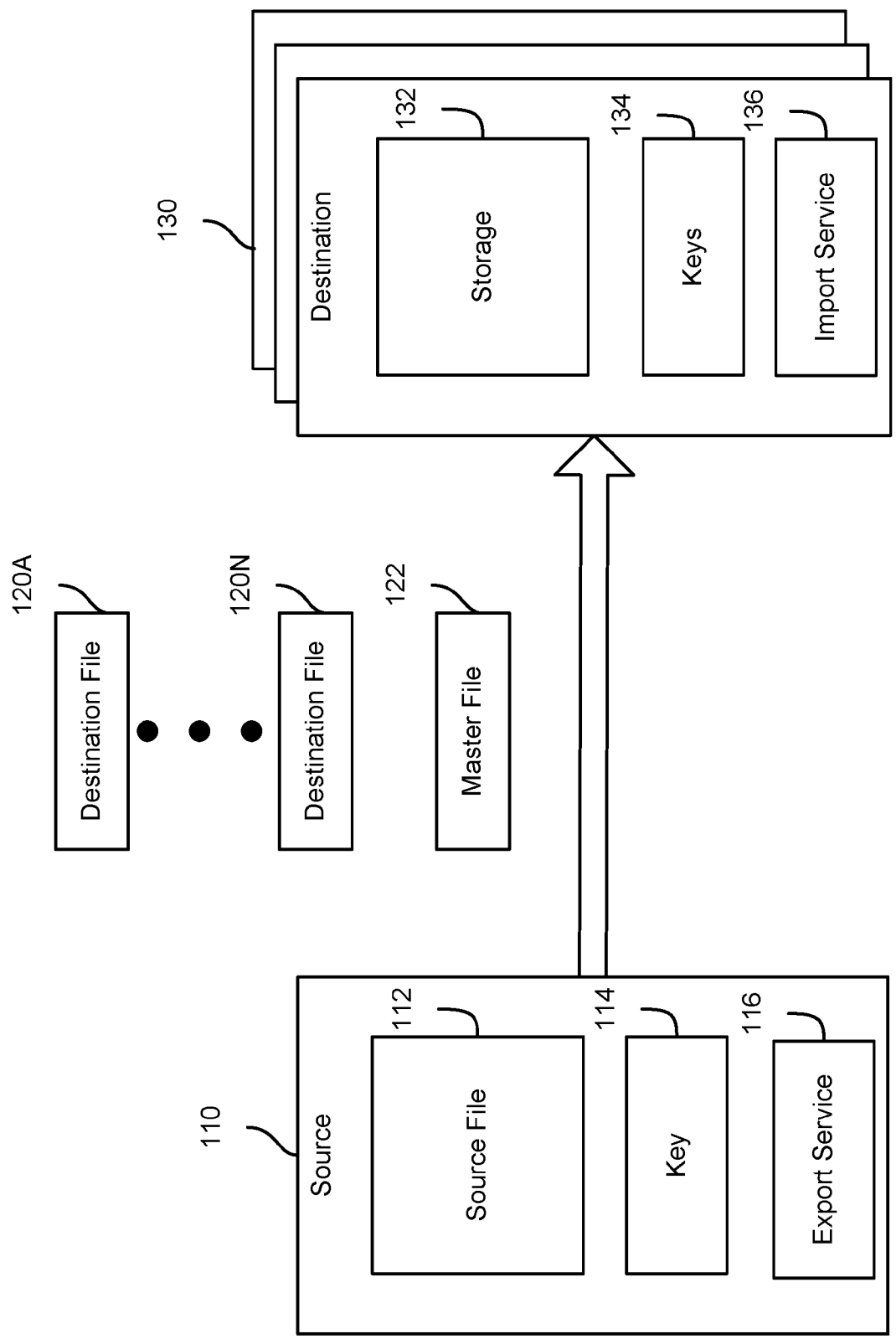
FIG. 1 illustrates an example environment for transferring data, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques relating to securely transferring data. In particular, data may be securely transferred between computing resources. For example, the data may reside in a source file on a source computing resource and may be transferred to a destination computing resource. In certain situations, a risk associated with the transfer may exist, such as a risk of a data hack. Securing the transfer may help against or eliminate this type of risk. In other situations, the amount of the data to be transferred may be large. If a limited bandwidth or busy network is to be used, the transfer may congest the network, may be throttled, or may be subject to other network management measures. Splitting the data may improve the network usage and, thus, the overall transfer. Embodied techniques may improve data security and transfers.

In particular, the embodied techniques provide multiple layers to securely and efficiently transfer data. In one layer, the data may be split into multiple destination files. In another layer, a master file may be generated and configured to track storage locations on the destination computing resource for storing the multiple files. In a further layer, the tracking may be one-directional, where the master file may point to the storage locations but where none of the destination files may point to storage locations of the master file or the other destination files. In yet another layer, the master file may hide the full addresses of the storage locations. Instead, the master file may track only partial addresses. In a further layer, the multiple files and the master file may be encrypted with keys associated with at least the storage locations. To transfer the data, the master file and the destination files may be sent instead of the source file. At the destination computing resource, the master file may be accessed and, as needed, decrypted. The storage locations of the destination files may be identified accordingly, may exist on a single computing system, and/or may be managed by a single entity or service provider. The destination files may then be accessed, allowing the data to be collected.

To illustrate, an entity may store data, such as customer-related data, on a source server residing on a private network. The customer-related data may include, for example, user names and passwords, order histories, and/or user preferences for each customer. The entity may desire to transfer the data, via a public network, to a destination server (e.g., residing on a different private network). To securely and efficiently transfer the data, three destination files may be generated: one storing the user names and passwords, one storing order histories, and one storing user preferences. Each of the three files may be destined for storage on a different partition of the destination server. A master file may be generated and may include a partial address for each of the destination files on the respective partition. The master file may be also destined for storage on a partition of the destination server. Further, each of these partitions may be associated with a pair of asymmetric keys. Accordingly, each of the destination files and the master file may be encrypted with a public key corresponding to the associated partition. Once encrypted, the four files may be sent (e.g., transmitted separately) over the public network to the destination server. At the destination server, the master file may be accessed, decrypted, and used to identify the addresses of the destination files. In turn, the three destination files may be accessed, allowing the collection of the user names and passwords, the order histories, and the user preferences.

In the interest of clarity of explanation, embodiments described herein are illustrated using an example of transferring data over a data network. However, the embodiments are not to be limited as such. In particular, the embodiments may similarly apply to transferring data using other techniques. For example, the data may be similarly split, stored, and/or securely stored on multiple storage devices. Each of the storage devices may be delivered via a same or different physical means to a destination (e.g., via various transport carriers and services). At the destination, the data may be collected from the different storage devices. Additionally, more or less than three destination files may be utilized to securely transfer the data.

Turning to FIG. 1, the figure illustrates an example environment for transferring data. In particular, data may be transferred from a source computing resource 110 to a destination computing resource 130. The transfer may occur over a public data network. In an embodiment, the transfer may be from one or more source computing resources to one or more destination computing resources.

The source computing resource 110 may be a computing node within a private network and represent a computing system suitable to perform various operations on data including generating, storing, splitting, encrypting, and/or sending. For example, the source computing resource 110 may be a server, a cluster of servers, or a server farm implemented on a collection of physical and/or virtual computing resources. In another example, the source computing resource 110 may include any or a combination of a mobile phone, a smart phone, a personal digital assistant (PDA), a laptop computer, a desktop computer, a thin-client device, a tablet PC, etc.

As illustrated, the source computing resource 110 may include, store, or host a source file 112, a key 114, and an export service 116. The source file 112 may represent a file storing data to be transferred to a destination. Data of the source file 112 may be of different types. In an illustrative example, the source file 112 may store user names and passwords, order histories, and user preferences associated with customers of an entity.

The key 114 may represent a set of encryption keys that can be used to protect the source file 112 and/or the data. For example, the key 114 may include an asymmetric key pair. A private key of the asymmetric key pair may be used to sign a hash of the data. This may help to determine whether the data may have been tampered with or not after the hash is signed.

The export service 116 may represent a computing service configured to export the data to the destination computing resource 130, as part of transferring the data. Configurations and operations of the export service 116 are further described in the next figures. Briefly, the export service 116 may use the source file 112 and the key 114 to export the data. For example, the export service 116 may split the source file 112 into multiple destination files 120A-N, generate a master file 122, and sign a hash of each of the files 120A-N and 122 using at least the key 114 (e.g., the private key).

Although FIG. 1 illustrates the source computing resource 110 storing the source file 112, the embodiments described herein are not limited as such. Instead, the source file 112 may reside on another computing node of the private network or another network. In such a situation, the export service 116 may nonetheless have access to the source file 112 to generate the destination files 120A-N and the master file 122.

A destination file 122 may represent a file that may store a portion of the data from the source file 112. As further illustrated in the next figures, the source file 112 or data therefrom may be divided into the plurality of destination files 120A-N based on one or more parameters. An example parameter includes the type of the data. In this example, each of the destination files 122A-N may store a portion of the data of certain type. For instance, the destination file 120A may store user names and passwords, while the destination file 120N may store user preferences. Another example parameter includes the amount of the data. In this example, the data may be split into portions, where each portion may be of a certain amount or size (e.g., in byte size). For instance, if the data occupies 1 GB and the parameter sets the size to 250 MB, the data may be divided into four destination files, each storing different 250 MB portions of the data.

A master file 122 may represent a file that may track information about the destination files 120A-N. For example and for each of the destination files 120A-N, the master file 122 may store location information about a storage location of the destination computing resource 130 storing the destination file. Example embodiments of the master file 122 are further illustrated in FIG. 3.

Rather than sending the source file 112 or transmitting the data therefrom to the destination computing resource 130, the destination files 120A-N and the master file 122 may be transferred instead. The destination computing resource 130 may receive and store these files 120A-N and 122 in storage 132. The destination computing resource 130 may also store keys 134 and host an import service 136 for extracting the data from the destination files 120A-N and the master file 122.

The destination computing resource 130 may be a computing node within a private network and/or may represent a computing system suitable to perform various operations on data including receiving, storing, decrypting, and extracting. For example, the destination computing resource 130 may be a server, a cluster of servers, or a server farm implemented on a collection of physical and/or virtual computing resources. In another example, the destination computing resource 130 may include any or a combination of a mobile phone, a smart phone, a personal digital assistant (PDA), a laptop computer, a desktop computer, a thin-client device, a tablet PC, etc. In a further example, the destination computing resource 130 may include a computing system configured to provide one or more storage services. An example storage service may include further splitting and storing the received files at different locations. Further, the destination computing resource 130, whether including a single destination computing device or a plurality of destination computing devices, may be managed by one or more entities. For example, a storage entity (e.g., a data storage service provider, a cloud service provider, etc.) may configure and operate the computing resource 130 to perform the various data operations.

Figure 2:
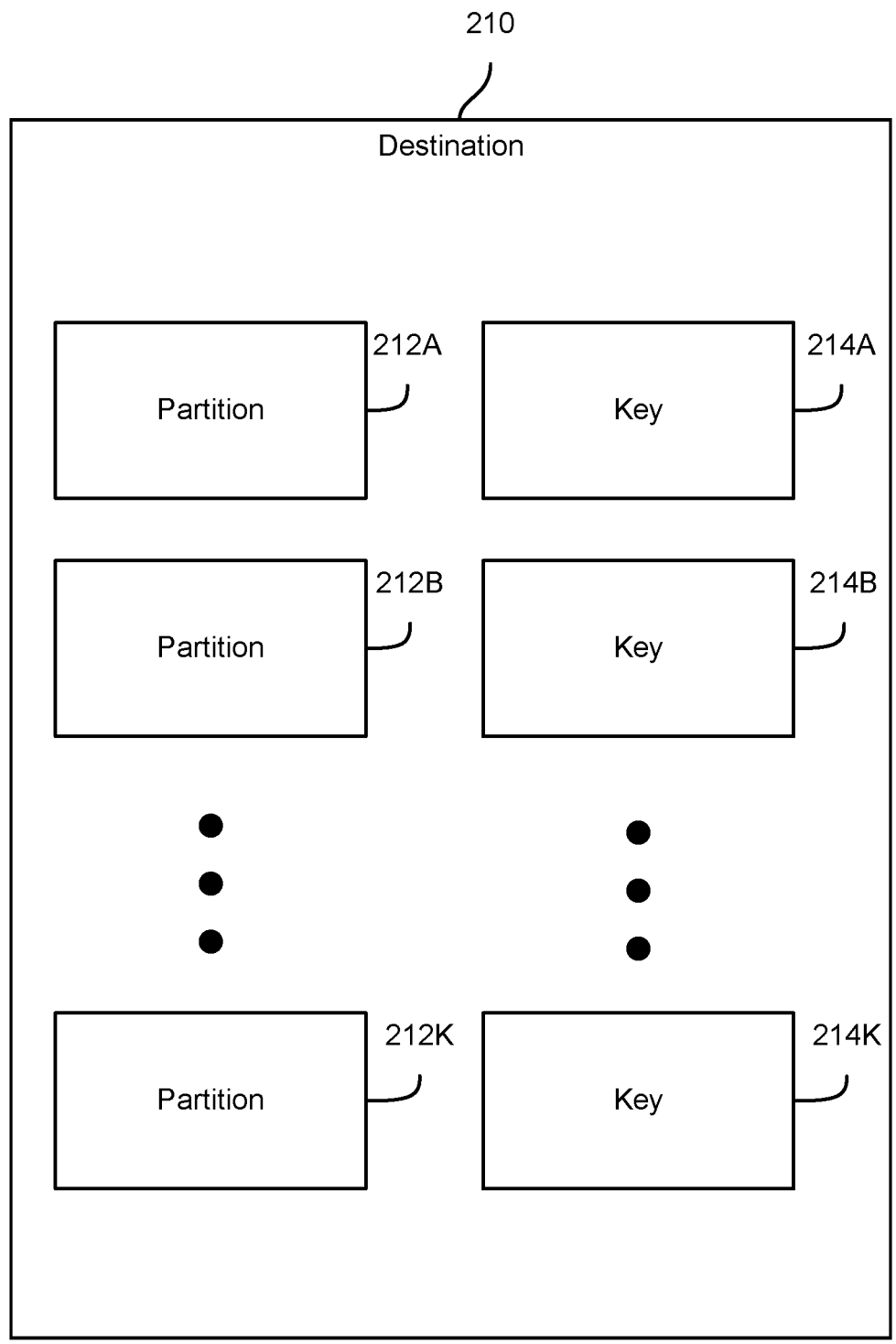
FIG. 2 illustrates an example computing resource storing data, according to embodiments.

The storage 132 of the destination computing resource 130 may represent a storage space for storing files and data. As further illustrated in FIG. 2, the storage 132 may be partitioned into multiple partitions. Each partition may be configured to store one or more files.

The keys 134 may represent a set of encryption keys that can be used to protect the stored files. For example, each of the keys 134 may be associated with a partition and may include an asymmetric key pair. A public key associated with a partition may be used by the source computing device 110 to encrypt a destination file destined to be stored on that partition. In this way, only the destination computing resource 130 may be able to decrypt that destination file by using the associated private key.

The import service 136 may represent a computing service configured to import the data from the received files. Importing the data may include storing the destination files 122A-N and the master file 122 in the storage 132 and extracting the data therefrom. Configurations and operations of the import service 136 are further described in the next figures. Briefly, the import service 136 may access and decrypt the master file 122 from the storage 132, identify the locations of the destination files 120A-N in the storage 132 based on location information in the master file 130, and access and decrypt the destination files to collect the data.

Further, the import service 136 and the export service 116 may be configured to communicate with each other to facilitate the data export (e.g., generate and send the destination files 122A-N and the master file 122) and import (store the destination files 122A-N and the master file 122 and extract the data therefrom). This communication may include, for example, exchanging information about the key 114 and the keys 134, location information about the storage 132, and notifications about the export and import. To illustrate, the export service 116 may provide a public key from the key 114 and, similarly, the import service 136 may provide public keys from the keys 134. In addition, the import service 136 may provide storage locations, such as addresses on the partitions of the storage 132. In yet another example, the export service 116 may provide a notification when an export is performed and, similarly, import service 136 may provide a notification when an import is performed.

Hence, the computing environment of FIG. 1 may allow a data transfer by splitting the data into multiple destination files, tracking destination locations of the destination files in a master file, and protecting the various files with encryption keys. This approach may enhance the security of the data transfer against data hacking. Further, because the data may be transferred in multiple destination files rather than a single master file, scheduling the export and import of the destination files may be possible. This scheduling may improve bandwidth and resource usage of the underlying data network and computing resources and, thus, the efficiency of the data transfer.

As described herein above, the storage 132 of the destination computing resource 130 may include a plurality of partitions for storing the destination files 122A-N and the master file. An example of partitioning the storage 132 is further illustrated in FIG. 2. As illustrated, a destination computing resource 210, similar to the destination computing resource 130 of FIG. 1, may include a plurality of partitions 212A-K and a plurality of keys 214A-K. The partitions 212A-K may collectively represent the storage 132 or a portion of the storage 132. Similarly, the keys 214A-K may also represent the keys 134 or a subset of the keys 134.

In particular, a partition 212 may represent a storage space for storing data. The partition may have a root address (e.g., C:\). When a file is stored on the partition 212, a path to the stored file (e.g., \filename.extension) may be provided to facilitate access to the file. The root address and the path (e.g., C:\filename.extension) may collectively represent a location of the file on the destination computing resource 210.

Further, each of the partitions 212A-K may be associated with one of or a different key from the keys 214A-K. For example, the partition 212A may be associated with the key 214A. When a file is stored at the partition 212A, the file may (already or otherwise) be protected with the key 214A. The protection may include encrypting the file with, for example, a public key from the key 214A. In that way, only the destination computing resource 210 may be capable of decrypting the file by using the private key from the key 214A.

When transferring data from a source computing resource, such as the source computing resource 110 of FIG. 1, to the destination computing resource 210, the data may be divided into multiple destination files to be stored at the destination computing resource 210. Each of the destination files may be destined for storage in one of the partitions 212A and may thus have a storage location including a root and a path. A master file may track these storage locations. The master file may also be destined for storage in one of the partitions. In addition, the source computing resource may encrypt each of the destination files and the master file may with a public key corresponding to the partition where the file is to be stored.

To improve the security of the data transfer, the master file may track partial information about the storage locations of the destination files. For example, rather than storing both a root and a path of a destination file, the master file may include only the path and may exclude the root. On the other hand, the source and destination computing resources may exchange information about the root via the respective export and import services. In that way, the destination computing resource may be able to identify the full address and, thus, the storage location of the destination file by combining the path from the master file and the known root location. In contrast, if the master file is compromised or accessed by an unauthorized user, the usage of the information from the master file may have limited usability, if any. That may be because the full storage location may not be determined solely from the master file.

Figure 3:
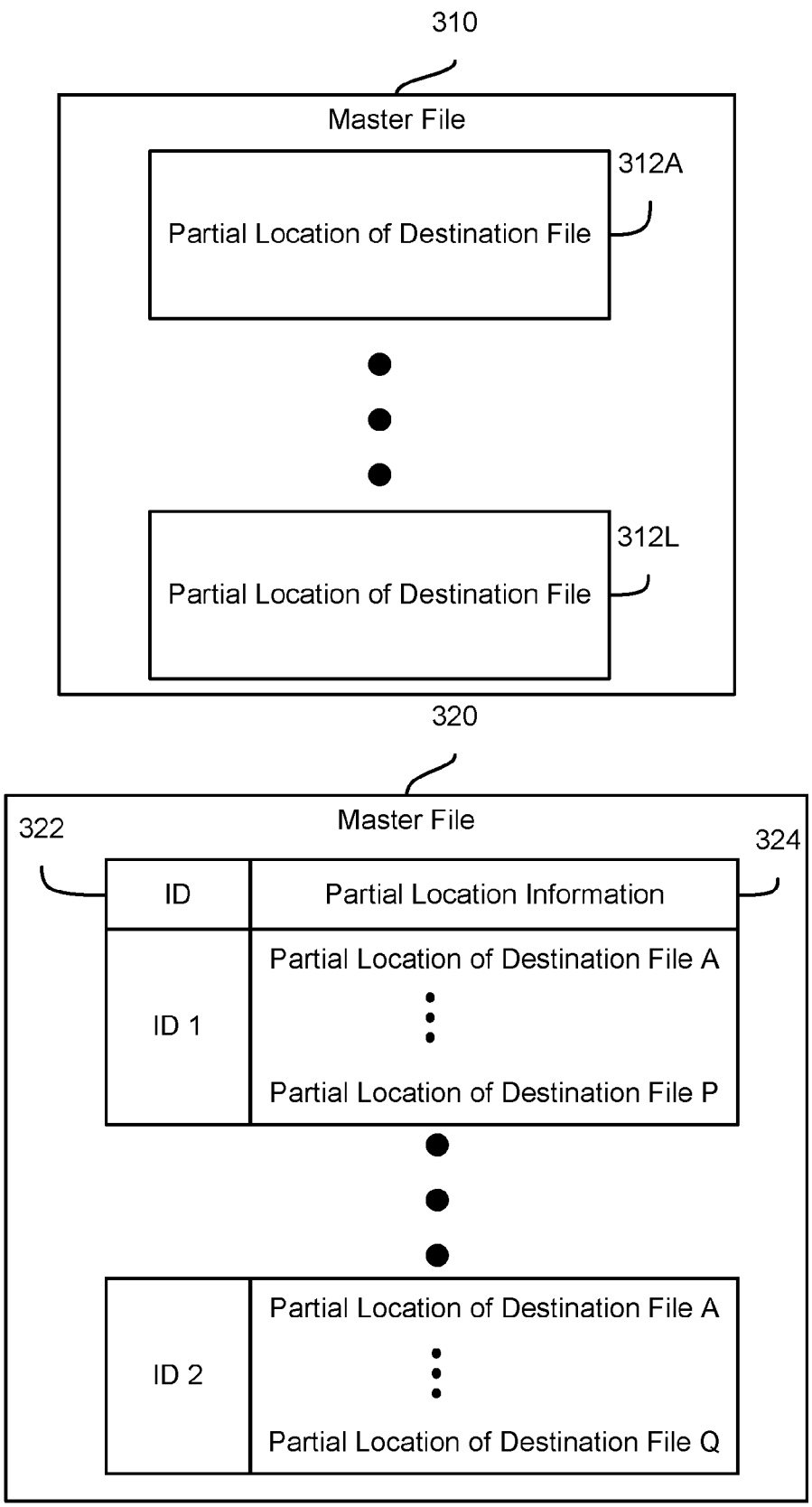
FIG. 3 illustrates an example file for facilitating data transfers, according to embodiments.

FIG. 3 illustrates example embodiments of a master file configured to track partial information about the storage locations of the destination files. In particular, two example master files are illustrated. A master file 310 may be used to track information about destination files associated with a single source file. In comparison, a master file 320 may be used to track information about destination files associated with a plurality of source files.

The master file 310 may store various information about destination files. For example, the information may include partial location for each of the destination files. A partial location may represent a portion of the storage location or address on a destination computing resource at which a destination file may be stored. To illustrate, the partial location may include a path on a partition of the destination computing resource, but may exclude a root of the partition. As such, the master file 310 may hide the full location of a destination file and may, instead, expose only a partial location.

Other additional information unrelated to locations may also be stored. For example, the master file 310 may store a portion of the data from the source file. In another example, the master file 310 may store an order in which the different destination files should be accessed to collect the data or in which the collected data should be arranged.

The master file 320 may be similar to the master file 310, but may store information related to the plurality of source files. Each source file may be associated with an entity. An entity may represent a user, such as an organization, a customer, or other types of users. To illustrate, one source file may exist for each customer, where the source file may track the user name and password, order history, and the user preferences of the customer. As such, the master file 320 may store an identifier 322. The identifier 322 may be used to identify each of the entities and/or source files. Partial location information 324 may be stored for each of the entities and/or source files. Thus, each identifier may be associated with partial location information. In an example, the partial location information associated with an identifier of a source file (or an entity) may include information about the partial locations of all of the destination files generated from the source file.

The configuration of a master file, such as the master files 310 and 320, may be one directional to further improve the security of a data transfer. In particular, the master file may be configured as a pointer to locations (or partial locations) of the destination files. As illustrated in FIG. 3, this may be accomplished by storing in the master file location information of the destination files. In comparison, a destination file may not be configured as a pointer to a location (or partial location) of a master file. In a further embodiment, a destination file may not be configured as a pointer to a location (or partial location) of other destination files. In this way, access to the destination files may be controlled by the master file such that an unauthorized access to a destination file may not compromise the remaining destination files and, thus, the data distributed therebetween.

In an example, several one directional hierarchies may be used. For example, a master file may point to locations (or partial locations) of a plurality of files. Some or each of these files may in turn represent another master file and/or a destination file and may further point to locations (or partial locations) of another set of files. This hierarchy may be repeated at several levels based on a set of factors, such as the number of files, the amount of data, the desired security, and other factors. Generally, increasing the hierarchy may improve the security.

Figure 4:
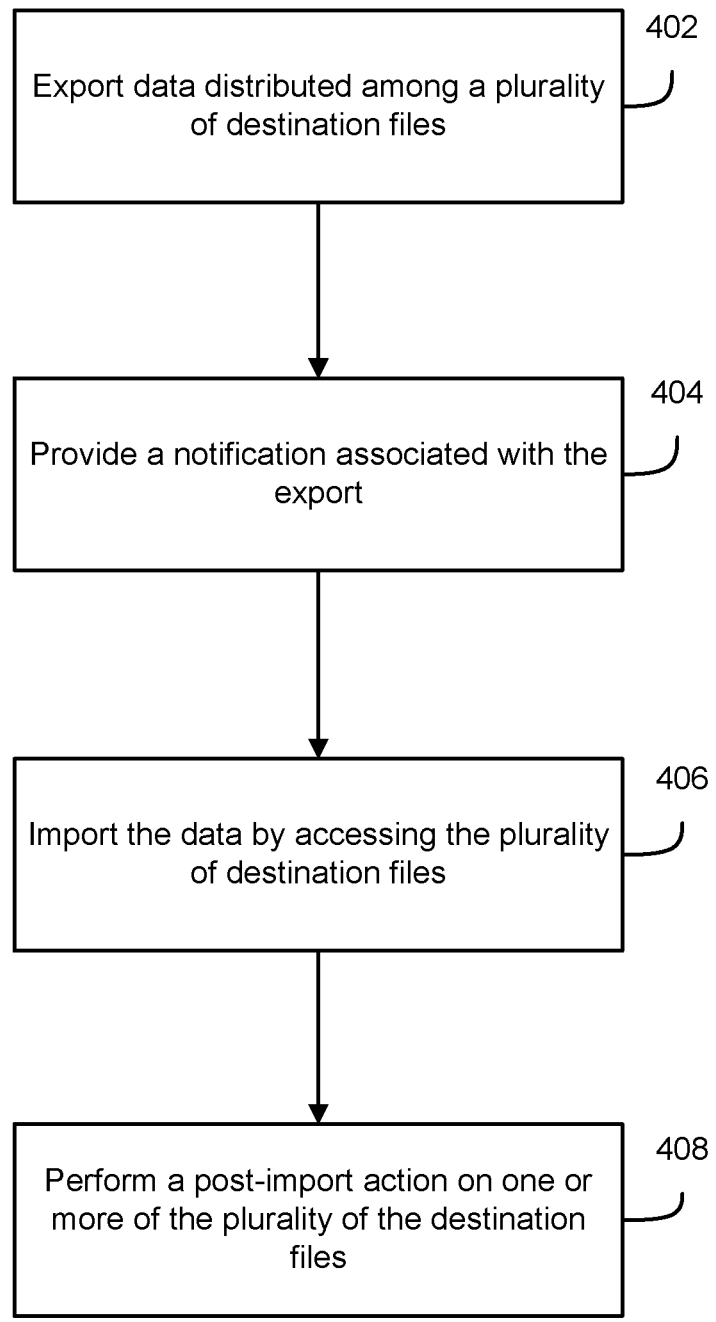
FIG. 4 illustrates an example flow for transferring data, according to embodiments.
Figure 5:
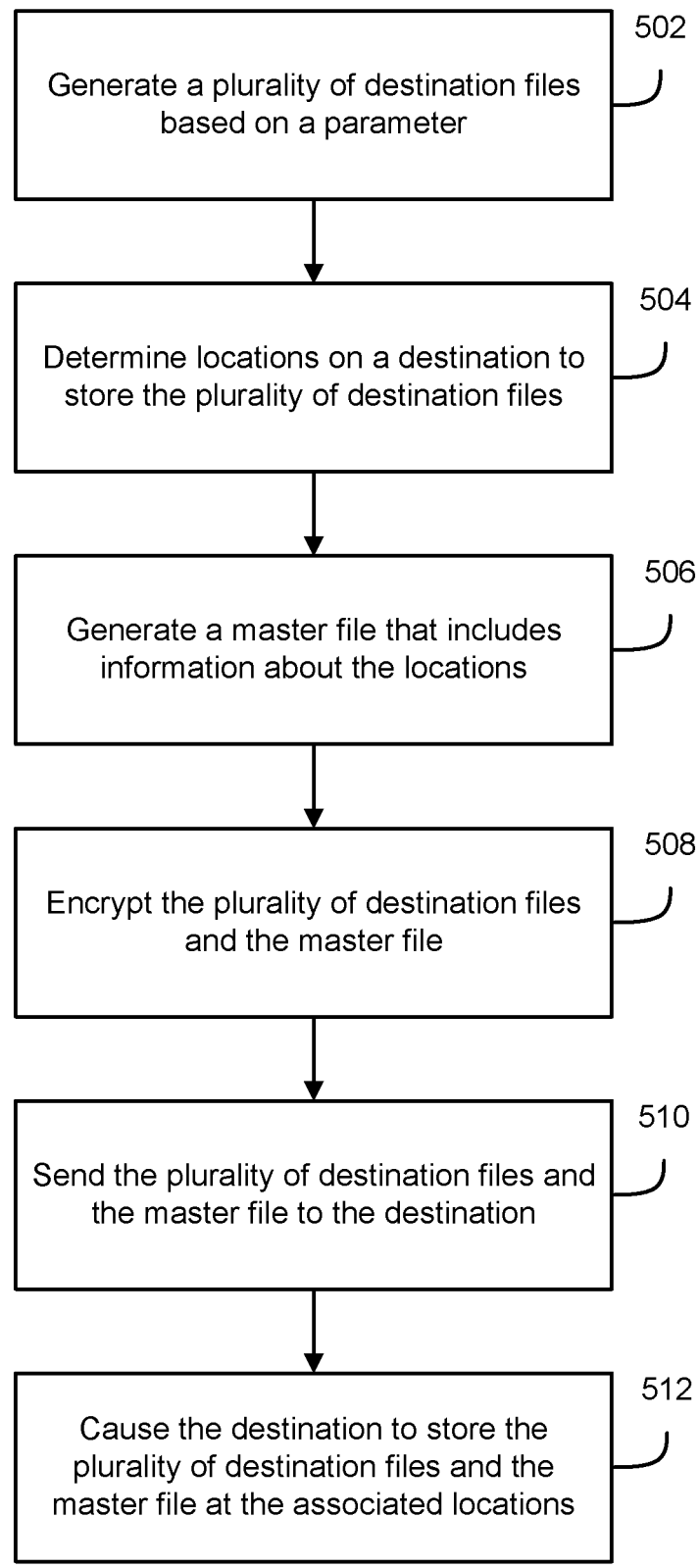
FIG. 5 illustrates an example flow for exporting data, according to embodiments.
Figure 6:
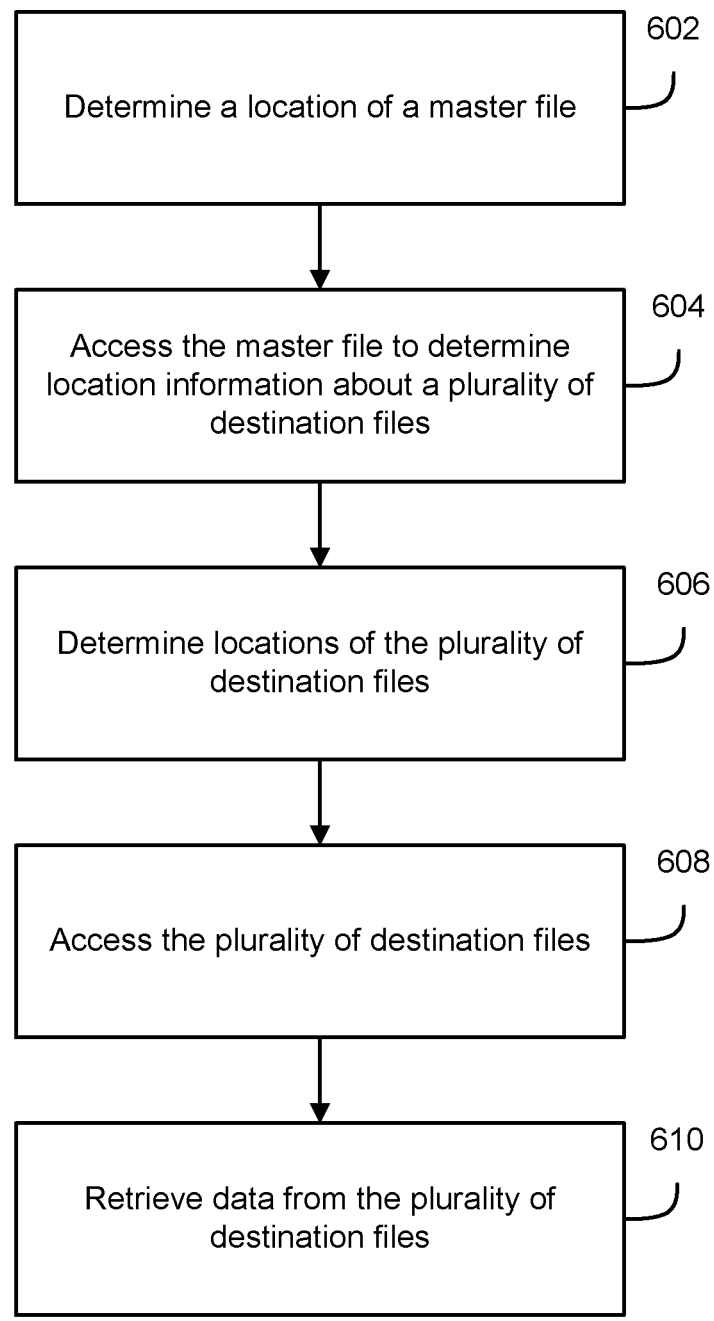
FIG. 6 illustrates an example environment for importing data, according to embodiments.

Turning to FIGS. 4-6, those figures illustrate example flows for transferring data. FIG. 4 illustrates an example end-to-end flow that may include exporting and importing data. In comparison, FIG. 5 illustrates an example flow for exporting data and FIG. 6 illustrates an example flow for importing data. Some of the operations of the example flow FIG. 4 may be further embodied in operations of the example flows of FIGS. 5 and 6. Thus, some operations may be similar. Such similarities are not repeated herein in the interest of clarity of explanation.

Further, in the illustrative operations, some of the operations or functions may be embodied in, and fully or partially automated by, modules executed by one or more processors. For example, an export service hosted on a source computing resource, such as the export service 116 of FIG. 1, may be configured to perform some of the operations. Similarly, an import service hosted on a destination computing resource, such as the import service 136 of FIG. 1, may be configured to perform some of the operations. Nevertheless, other or a combination of other computing devices, services, and modules may be additionally or alternatively used. Also, while the operations are illustrated in a particular order, it should be understood that no particular order is necessary and that one or more operations may be omitted, skipped, and/or reordered.

The example flow of FIG. 4 may start at operation 402, where data distributed among a plurality of destination files may be exported. Exporting may include generating a plurality of destination files and an associated master file from a source file, encrypting the generated files, and sending the encrypted files for storage at a destination computing resource.

At operation 404, a notification associated with the export may be provided. For example, the export service may send a notification to an import service hosted on the destination computing resource. In an example, the notification may solely provide an alert that the export may have been performed. In this example, the import service may have prior knowledge of the full location of the master file and, thus, may be capable of accessing the master file. In another example, the notification may include the master file. In this example, in addition or alternatively to storing the master file on the destination computing resource, the export service may transmit the master file to the import service, thereby allowing the import service access to the master file. In yet another example, the notification may include location information (partial or full) of the master file as exported (e.g., sent for storage) at a storage location on the destination computing resource. If partial information is sent (e.g., a path, but not a root address), the import service may have prior knowledge of the remaining location information to enable the access to the master file.

At operation 406, the data may be imported by accessing the plurality of destination files. For example, the import service may access the master file to identify locations of the destination files. If the master file includes partial location information (e.g., paths but not root addresses), the import service may have prior knowledge of the remaining location information (e.g., the root addresses). As such, the import service may access the destination files and collect or extract the data from these files. In addition, if the master file includes an order for assembling or organizing the data, the import service may assemble and save the data according to the order in a new file on the destination computing resource.

At operation 408, one or more post import actions may be performed. For example, the import service may perform an action or a combination of actions on one or more of the plurality of destination files and the master file. These actions may include deleting some or all of these files. In another example, the import service may send a notification to the export service acknowledging the export and import of the data.

Turning to FIG. 5, the figure illustrates a more detailed example process for exporting the data. Some or all of the operations of the example flow of FIG. 5 may embody operation 402 of FIG. 4. In particular, the example flow of FIG. 5 may start at operation 502, where the export service may generate a plurality of destination files based on a parameter. The export service may access data from a source file and divide or distribute the data across the destination files based on the parameter, thereby splitting the source file.

The parameter may include the type of the data. In this example, each of the destination files may store a portion of the data of certain type. To illustrate, a source file may include user names and passwords, order histories, and user preferences, representing three types of data. Accordingly, the export service may generate three destination files, each storing one of the types of the data. For example, one of the destination files may store user names and passwords. Another destination file may store the order histories. A third destination file may store the user preferences.

Another example parameter includes the amount of the data. In this example, the data may be split into portions, where each portion may be of a certain amount (e.g., in byte size). For instance, if the data occupies 1 GB and the parameter sets the size to 250 MB, the export service may generate four destination files, each storing different 250 MB portions of the data.

At operation 504, the export service may determine storage locations on the destination computing resource to store the destination files. For example, the export service may communicate with the import service to identify the storage locations. In an embodiment, the export service may request and receive the respective location information from the import service. In another embodiment, the export service may receive available location information from which the export service may select certain storage locations. In both embodiments, the received location information may include full or partial location information.

At operation 506, the export service may generate a master file that may include information about the locations. In an example, the master file may list, for each destination file, partial information about the respective storage location for storing the destination files on the destination computing resource. In another example, the master file may list the full location information. In yet another example, the master file may list partial location information for some of the destination files and full location information for other destination files. In addition to location information, the export service may include in the master file one or more of an identifier of an entity or entities associated with the source file, an identifier of the source file, an order for accessing the destination files, an order for assembling data extracted from the destination files, a portion of the data from the source file, and/or other information.

In an embodiment, the export service may also determine a storage location on the destination computing resource by, for example, communicating with the import service. As such, the export service may receive a full or partial location information about the storage location from the import service. In this embodiment, the master service may be sent to the destination computing resource for storage at the storage location, similarly to sending and storing the destination files.

At operation 508, the export service may encrypt the destination files and the master file. These files may be encrypted based on different keys. In an example, the encryption may be two folds. First, each of the files may be hashed. Each of the hashes may be signed with a private signature of the source computing resource. The signed hashes may then be included in the respective files. Second, each of the files may be encrypted with an encryption key (e.g., a public key) associated with the respective storage location on the destination computing resource. The export service may receive these keys from, for example, the import service.

In an embodiment, the master file may not be sent for storage at the destination computing resource. Instead, the export service may send the master file in a notification to the import service. In this embodiment, an encryption key specific to a storage location of the destination computing resource may not be proper to use for encrypting the master file. As such, the export service may encrypt the master file with an encryption key (e.g., a public key) more generally associated with the destination computing resource rather than a storage location specific key.

At operation 510, the export service may send the plurality of destination files and the master file to the destination computing resource. The sent files may be encrypted, as explained at operation 508. Sending the files may include transmitting the files from the source computing resource to the destination computing resource over a network. For example, the transmission may occur over a public network and through firewalls of private networks hosting the source computing resource and the destination computing resource.

At operation 512, the sending of the files may cause the destination computing resource to store the files at the associated storage locations. For example, the import service (or another storage service hosted on destination computing resource) may store each of the destination files at the respective storage location. Similarly, if the master file is to be stored, the import service (or the other storage service) may store the master file at the respective location.

Once the data is exported by using the destination files and the master file, the destination computing resource may import the data to perform various actions on the data. FIG. 6 illustrates an example process for importing the data. In particular, the example flow of FIG. 6 may start at operation 602, where the import service may determine a storage location at which the master file may be stored. This determination may be triggered by an event. For example, receiving a notification from the export service may represent a trigger event. In this example, the master file may be included in the notification. Alternatively, location information about the storage location may be included in the notification. If partial location information (e.g., a path but not a root address) is included in the notification, the import service may have access to the remaining portion of the location information (e.g., may have prior knowledge of the root address). In this case, the import service may identify the storage location by combining the partial location information from the notification and the known remaining location information. In yet another alternative, the storage location may be predefined and, thus, the notification may not include any location information. In another example of a trigger event, the import service may periodically or at time intervals look for, pull, or access a predefined location storing master files.

At operation 604, the import service may access the master file to determine location information about the associated destination files. This access may include decrypting the master file when protected and decrypting a hash of the master file when available to identify potential tampering. When accessed, the location information may be retrieved from the master file. This location information may be partial (e.g., only listing paths but not root addresses of the storage locations of the destination files) or may be full (e.g., listing the full addresses of the storage locations). Other information may be also retrieved from the master file, such as an identifier(s) of an entity(ies), an identifier(s) of a source file(s), an order for accessing the destination files, an order for assembling or organizing data extracted from the destination files, and/or a portion of the data from the source file(s).

At operation 606, the import service may determine the storage locations of the destination files. In an example, if the master file includes full location information, the storage locations may be identified based on this information. In another example, if the master file includes partial location information (e.g., paths but not root addresses), the import service may have access to the remaining portions of the location information (e.g., may have prior knowledge of the root addresses). In this case, the import service may combine the location information from the master file and the remaining portions of the location information to identify the storage locations.

At operation 608, the import service may access the destination files based on, for example, the determined storage locations. If the master file includes an order for accessing the destination files, the access of the import service may follow that order. As such, the import service may traverse the master file, determine the storage locations and an access order, if included, and may accordingly access the destination files.

At operation 610, the import service may retrieve data from the destination files. For example, the import service may extract and collect data from each of the destination files and may generate one or more new files storing this data. If the master file includes an order for assembling or organizing the data, the import service may follow this order in generating the new file(s). Once the data is retrieved, the import service may send a notification to the export service acknowledging a completion of the import process.

Figure 7:
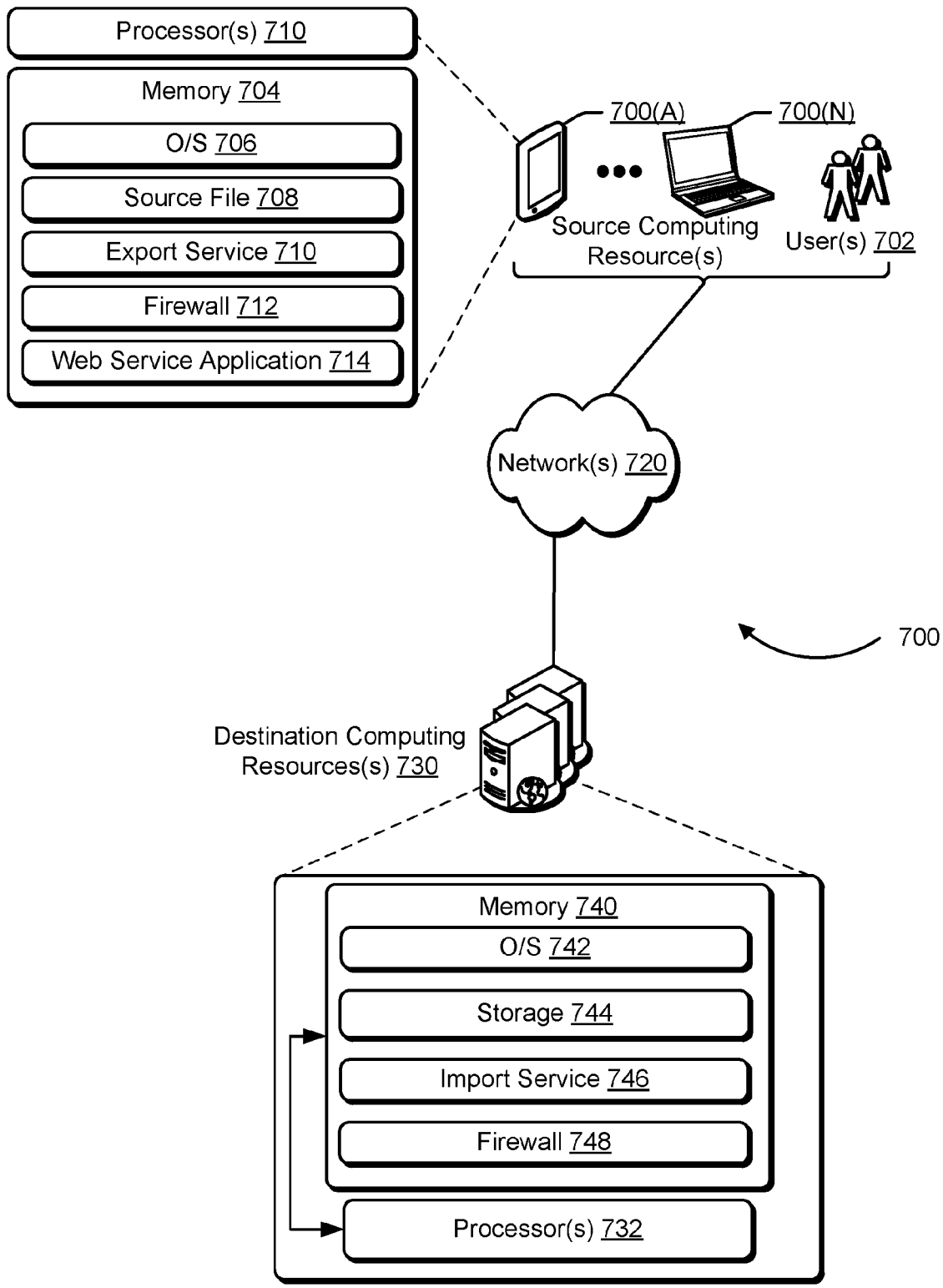
FIG. 7 illustrates an example computing architecture for transferring data, according to embodiments.

Turning to FIG. 7, that figure illustrates example architecture 700 for transferring data between one or more source computing resources 700 and one or more destination computing resources 730. In architecture 700, the computing resource may be in communication over one or more networks 720 to implement a computing environment in which data may be exported and imported.

In a basic configuration, one or more users 702 may utilize one or more computing source computing resources 700(A)-(N) (which may be referred to in the singular as a "source computing resource 700" or in the plural as "source computing resources 700") to access local applications, a web service application 714, a user account accessible through the web service application 714, or a web site or other network resource via the one or more networks 720 (which may be referred to herein in the singular "network 720" or in the plural "networks 720"). In some aspects, the web service application 714, web site, and/or user account may be hosted, managed, and/or otherwise provided by one or more computing resources of a service provider associated with the one or more destination computing resource(s) 730 (which may be referred to in the singular as a "destination computing resource 730" or in the plural as "destination computing resources 730").

In some examples, the source computing resource 700 may be any type of computing devices such as, but not limited to, an e-book reader, a mobile phone, a smart phone, a personal digital assistant (PDA), a laptop computer, a thin-client device, a tablet PC, a server, a cluster of servers, or computing nodes implemented on a collection of physical and/or virtual computing resources, etc. In one illustrative configuration, the source computing resource 700 may contain communications connection(s) that allow the source computing resource 700 to communicate with a stored database, another computing device or server, user terminals, and/or other devices on networks 720. The source computing resource 700 may also include input/output (I/O) device(s) and/or ports, such as for enabling connection with a keyboard, a mouse, a pen, a voice input device, a touch input device, a display, speakers, a printer, etc.

The source computing resource 700 may also include at least one or more processing units (or processor(s)) 710 and one memory 704 and. The processor(s) 710 may be implemented as appropriate in hardware, computer-executable instructions, firmware, or combinations thereof. Computer-executable instruction or firmware implementations of the processor(s) 710 may include computer-executable or machine-executable instructions written in any suitable programming language to perform the various functions described.

The memory 704 may store program instructions that are loadable and executable on processor(s) 710, as well as data generated during the execution of these programs. Depending on the configuration and type of the source computing resource 700, the memory 704 may be volatile (such as random access memory (RAM)) and/or non-volatile (such as read-only memory (ROM), flash memory, etc.). The source computing resource 700 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 704 may include multiple different types of memory, such as static random access memory (SRAM), dynamic random access memory (DRAM), or ROM.

Turning to the contents of the memory 704 in more detail, the memory may include an operating system 706 and the one or more application programs or services for implementing the features disclosed herein including an export service 710. The memory 704 may also store one or more source files 708. However, these source files may alternatively be stored at a remote location and may be accessed by the export service 710 remotely. The memory 704 may also store instructions for providing a firewall 712. The firewall 712 may be configured to protect against unauthorized access.

The memory 704 may also store instructions for providing the web service application 714. As described briefly above, the web service application 714 may allow the users 702 to interact with the destination computing resource 730. In an example, the web service application may integrate, be integrated with, or provide an interface to the export service 710. In this example, the users 702 may interact with various services hosted on the destination computing resource 730 via the web service application 714 or the export service as applicable. The destination computing resource 730, perhaps arranged in a cluster of servers or as a server farm, may host the web service application 714. These servers may be configured to host a website (or combination of websites) viewable via the source computing resource 700 and to facilitate the export/import of data. Other server architectures may also be used to host the web service application 714. The web service application 714 may be capable of handling requests from many the users 702 and serving, in response, various user interfaces that can be rendered at the source computing resource 700 such as, but not limited to, a web site. The web service application 714 can interact with any type of web site that supports user interaction, including social networking sites, electronic retailers, data storage sites, informational sites, blog sites, search engine sites, news and entertainment sites, and so forth. As discussed above, the described techniques can similarly be implemented outside of the web service application 714, such as with other applications running on the source computing resource 700.

In some examples, the source computing resource 700 may be in communication with the destination computing resource 730 via the networks 720, or via other network connections. The networks 720 may include any one or a combination of many different types of networks, such as cable networks, the Internet, wireless networks, cellular networks, and other private and/or public networks. While the illustrated example represents users 702 accessing web service application 714 and over the networks 720, the described techniques may equally apply in instances where the users interact with the destination computing resource 730 via the source computing resource 700 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

The destination computing resource 730 may, in some examples, provide computing resources such as, but not limited to, applications for purchase and/or download, web sites, web hosting, client entities, data storage, data access, data transfer, data management, virtualization, etc. The destination computing resource 730 may also be operable to provide web hosting, computer application development, and/or implementation platforms, or combinations of the foregoing to the users 702.

The destination computing resource 730 may be any type of computing device such as, but not limited to, a mobile phone, a smart phone, a personal digital assistant (PDA), a laptop computer, a desktop computer, a server computer, a thin-client device, a tablet PC, etc. The destination computing resource 730 may also contain communications connection(s) that allow the destination computing resource 730 to communicate with a stored database, other computing devices or server, user terminals, and/or other devices on the networks 720. The destination computing resource 730 may also include input/output (I/O) device(s) and/or ports, such as for enabling connection with a keyboard, a mouse, a pen, a voice input device, a touch input device, a display, speakers, a printer, etc.

Additionally, in some embodiments, the destination computing resource 730 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the destination computing resource 730 may be in communication with the source computing resource 700 via the networks 720, or via other network connections. The destination computing resource 730 may include one or more servers, perhaps arranged in a cluster, or as individual servers not associated with one another.

In one illustrative configuration, the destination computing resource 730 may include at least one or more processing units (or processor(s)) 732 and one memory 740. The processor(s) 732 may be implemented as appropriate in hardware, computer-executable instructions, firmware, or combinations thereof. Computer-executable instruction or firmware implementations of the processor(s) 732 may include computer-executable or machine-executable instructions written in any suitable programming language to perform the various functions described.

The memory 740 may store program instructions that are loadable and executable on the processor(s) 732, as well as data generated during the execution of these programs. Depending on the configuration and type of the destination computing resource 730, the memory 740 may be volatile (such as random access memory (RAM)) and/or non-volatile (such as read-only memory (ROM), flash memory, etc.). The destination computing resource 730 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 740 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media do not include computer-readable communication media.

Turning to the contents of the memory 740 in more detail, the memory may include an operating system 742, storage 744, an import service 746, and a firewall 748. The storage 744 may be partitioned in multiple partitions. However, in an embodiment the storage 744 may be remote and may be accessed by the import service 746 remotely. The firewall 748 may be configured to protect against unauthorized access.

The memories 740 and 704, and the additional storage are examples of computer-readable storage media. For example, computer-readable storage media may include volatile or non-volatile, removable, or non-removable media implemented in any method or technology for storage of information such as computer-readable instructions, data structures, program modules, or other data. As used herein, modules may refer to programming modules executed by computing systems (e.g., processors) that are part of the source computing resource 700 or the destination computing resource 730.

Additional types of computer storage media that may be present in the source computing resource 700 or the destination computing resource 730 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the source computing resource 700 or the destination computing resource 730. Combinations of any of the above should also be included within the scope of computer-readable media.

Figure 8:
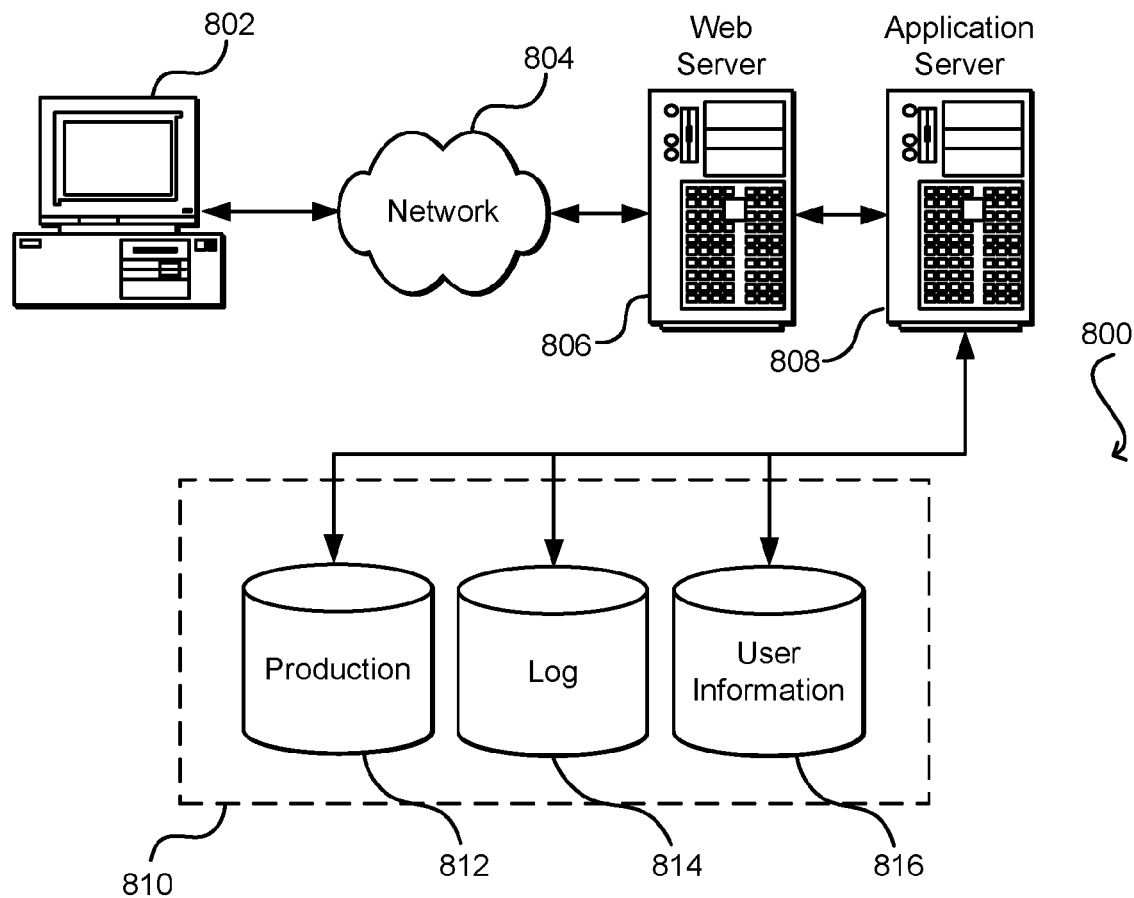
FIG. 8 illustrates an environment in which various embodiments may be implemented.

Turning to FIG. 8, the figure illustrates aspects of an example environment 800 capable of implementing the above-described structures and functions. As will be appreciated, although a Web-based environment is used for purposes of explanation, different environments may be used, as appropriate, to implement various embodiments. The environment includes an electronic client device 802, which may include any appropriate device operable to send and receive requests, messages, or information over an appropriate network(s) 804 and convey information back to a user of the device. Examples of such client devices include personal computers, cell phones, handheld messaging devices, laptop computers, set-top boxes, personal data assistants, electronic book readers, or any other computing device. The network(s) 804 may include any appropriate network, including an intranet, the Internet, a cellular network, a local area network or any other such network or combination thereof. Components used for such a system may depend at least in part upon the type of network and/or environment selected. Protocols and components for communicating via such a network are well known and will not be discussed herein in detail. Communication over the network may be enabled by wired or wireless connections and combinations thereof. In this example, the network includes the Internet, and the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there may be several application servers, layers, or other elements, processes or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed, or clustered environment. The application server may include any appropriate hardware and software for integrating with the data store as needed to execute aspects of one or more applications for the client device, handling a majority of the data access and business logic for an application. The application server 808 provides access control services in cooperation with the data store 810, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 802 and the application server 808, may be handled by the Web server 806. It should be understood that the Web and application servers 806 and 808 are not required and are merely example components, as structured code discussed herein may be executed on any appropriate device or host machine as discussed elsewhere herein.

The data store 810 may include several separate data tables, databases or other data storage mechanisms and media for storing data relating to a particular aspect. For example, the data store 810 illustrated includes mechanisms for storing production data 812 and user information 816, which may be used to serve content for the production side. The data store 810 is also shown to include a mechanism for storing log data 814, which may be used for reporting, analysis, or other such purposes. It should be understood that there may be many other aspects that may need to be stored in the data store 810, such as for page image information and to access correct information, which may be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user, and may access the catalog detail information to obtain information about items of that type. The information then may be returned to the user, such as in a results listing on a web page that the user is able to view via a browser on the client device 802. Information for a particular item of interest may be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of environment 800 in FIG. 8 should be taken as being illustrative in nature, and not limiting to the scope of the disclosure.

The various embodiments further may be implemented in a wide variety of operating environments, which in some cases may include one or more user computers, computing devices or processing devices which may be used to operate any of a number of applications. User or client devices may include any of a number of general purpose personal computers, such as desktop or laptop computers running a standard operating system, as well as cellular, wireless and handheld devices running mobile software and capable of supporting a number of networking and messaging protocols. Such a system also may include a number of workstations running any of a variety of commercially available operating systems and other known applications for purposes such as development and database management. These devices also may include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network may be, for example, a local area network, a wide-area network, a virtual private network, the Internet, an intranet, an extranet, a public switched telephone network, an infrared network, a wireless network, and any combination thereof.

In embodiments utilizing a Web server, the Web server may run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also may include a computer-readable storage media reader, a communications device (e.g., a modem, a network card (wireless or wired), an infrared communication device, etc.) and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, may include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which may be used to store the desired information and which may be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   accessing a master file from a location on a computing system, the master file encrypted with a key associated with the location and comprising information that partially identifies locations of files on the computing system, the files collectively comprising data that forms a source file and individually encrypted with a respective key associated with a respective location on the computing system;
   determining remaining information about the locations of the files;
   accessing the files from the locations on the computing system based at least in part on the information from the master file and the remaining information; and
   generating the source file based at least in part on the accessed files.

2. The computer-implemented method of claim 1, wherein accessing the master file comprises decrypting the master file based at least in part on the key, and wherein accessing the files comprises decrypting the files based at least in part on respective keys.

3. The computer-implemented method of claim 1, further comprising determining the locations of the files based at least in part on the information from the master file and the remaining information, and wherein the files are accessed based at least in part on the determined locations.

4. The computer-implemented method of claim 1, wherein the master file is accessed based at least in part on a notification about an export of the files to the computing system.

5. The computer-implemented method of claim 4, wherein the notification comprises the master file.

6. The computer-implemented method of claim 4, further comprising: retrieving the location of the master file on the computing system from storage, wherein the location is stored in the storage prior to a receipt of the notification, and wherein the master file is accessed based at least in part on the retrieved location.

7. The computer-implemented method of claim 4, wherein the notification partially identifies the location of the master file on the computing system, and further comprising:
accessing remaining identification of the location from storage, wherein the remaining identification is stored in the storage prior to a receipt of the notification; and
determining the location of the master file based at least in part on the notification and the remaining identification.

8. The computer-implemented method of claim 4, wherein determining the remaining information about the locations of the files comprises accessing the remaining information from storage, wherein the remaining information is stored in the storage prior to a receipt of the notification, further comprising determining the locations of the files based at least in part on the information from the master file and the accessed remaining information, and wherein the files are accessed based at least in part on the determined locations.

9. The computer-implemented method of claim 1, wherein the master file further comprises an order for assembling the data from the files, and wherein the source file is generated based at least in part on the order.

10. One or more non-transitory computer-readable storage media comprising instructions that, upon execution by one or more processors, configure the one or more processors to perform operations comprising:
accessing a master file from a location on a computing system, the master file encrypted with a key associated with the location and comprising information that partially identifies a first location of a first file and a second location of a second file on the computing system, the first file encrypted with a first key associated with the first location and comprising first data from a source file, the second file encrypted with a second key associated with the second location and comprising second data from the source file, the second data being different from the first data;
determining remaining information about the first location of the first file;
accessing the first file from first location on the computing system based at least in part at least in part on the information from the master file and the remaining information; and
generating the source file based at least in part on the first data from the first file.

11. The one or more non-transitory computer-readable media of claim 10, wherein the operations further comprise deleting at least one of the first file or the master file based at least in part on the source file being generated.

12. The one or more non-transitory computer-readable media of claim 10, wherein the master files further comprises a first hash of data of the source file, and wherein the operations further comprise:
decrypting the master file based at least in part on the key associated with the location of the master file on the computing system;
accessing the first hash from the decrypted master file;
generating a second hash from the source file based at least in part on the source file being generated; and
determining that the first data was not tampered based at least in part on a comparison of the first hash and the second hash.

13. The one or more non-transitory computer-readable media of claim 10, wherein the master files further comprises an order for accessing the first and second file, and wherein the first file is accessed and the source file is generated based at least in part on the order.

14. The one or more non-transitory computer-readable media of claim 10, wherein the master files further comprises an order for assembling the first data and the second data to generate the source file, and wherein the source file is generated based at least in part on the order.

15. A system, comprising:
one or more processors;
or more non-transitory computer-readable storage media comprising instructions that, upon execution by one or more processors, configure the system to at least:
access a master file from a location on a computing system, the master file encrypted with a key associated with the location and comprising information that partially identifies locations of files on the computing system, the files collectively comprising data that forms a source file, each of the files encrypted with a respective key associated with a respective location on the computing system;
determine remaining information about at least a first location of a first file of the files on the computing system;
access the first file from the first location on the computing system based at least in part on the information from the master file and the remaining information; and
generate the source file based at least in part on first data from the first file.

16. The system of claim 15, wherein the master file further comprises a portion of the data of the source file, and wherein the source file is further generated based at least in part on the portion of the data from the master file.

17. The system of claim 15, wherein the master file is accessed based at least in part on a receipt of a notification about an export of the files.

18. The system of claim 15, wherein the export of the files comprises a transmission of the files and the master file over a public network through firewalls to the computing system, and wherein the notification is received over the public network and independently of the firewalls.

19. The system of claim 15, wherein the information that partially identifies locations of files comprises a location root of the first file on the computing system, and wherein the remaining information about the first location of the first file comprises a location path and excludes the location root.

20. The system of claim 19, wherein the location root is known to the system independently of the master file.

* * * * *